United States Patent
Rowe et al.

(10) Patent No.: US 12,190,289 B2
(45) Date of Patent: Jan. 7, 2025

(54) ASSORTMENT PLANNING DATA MANAGEMENT

(71) Applicant: Target Brands, Inc., Minneapolis, MN (US)

(72) Inventors: James Preston Rowe, Minnetonka, MN (US); Rebecca Ann Danaher, Eagan, MN (US); Gangi Reddy Thimmasani, Plymouth, MN (US); Amith Krishnan, Minneapolis, MN (US); Kelly Anne Ellis, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 468 days.

(21) Appl. No.: 17/176,689

(22) Filed: Feb. 16, 2021

(65) Prior Publication Data

US 2022/0261753 A1 Aug. 18, 2022

(51) Int. Cl.
| | |
|---|---|
| *G06Q 10/0875* | (2023.01) |
| *G06F 3/0483* | (2013.01) |
| *G06F 3/0484* | (2022.01) |
| *G06F 9/54* | (2006.01) |
| *G06F 16/22* | (2019.01) |
| *G06F 16/28* | (2019.01) |

(52) U.S. Cl.
CPC ........ *G06Q 10/0875* (2013.01); *G06F 9/547* (2013.01); *G06F 16/2282* (2019.01); *G06F 16/285* (2019.01); *G06F 3/0483* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 8,352,324 B2 | 1/2013 | Moderegger et al. | |
| 10,109,004 B1 * | 10/2018 | Hawley | G06Q 10/06375 |
| 10,681,095 B1 * | 6/2020 | Wang | H04L 67/1097 |
| 2001/0047293 A1 | 11/2001 | Waller et al. | |
| 2003/0074250 A1 | 4/2003 | Burk | |
| 2005/0138375 A1 * | 6/2005 | Sadjadi | G06F 16/2343 |
| | | | 707/E17.007 |
| 2011/0106683 A1 * | 5/2011 | Davis | G06Q 30/0611 |
| | | | 705/37 |
| 2011/0191303 A1 * | 8/2011 | Kaufman | G06F 7/00 |
| | | | 707/684 |
| 2018/0315113 A1 * | 11/2018 | Shah | G06F 16/2428 |
| 2019/0334779 A1 * | 10/2019 | Woodward | G06F 16/2282 |
| 2020/0092178 A1 * | 3/2020 | Nelson | G06Q 10/06316 |

* cited by examiner

*Primary Examiner* — Haimei Jiang
(74) *Attorney, Agent, or Firm* — Merchant & Gould P.C.

(57) ABSTRACT

A software system operates to store information about a plurality of products in a common data management system that serves as a single source of truth for product information. Multiple different computing systems can access and edit item records. As information in the item records is updated, other computing systems can access the updated information immediately. The overall system is a multi-use tool for assortment planning that allows for flexible data sharing across the lifecycle of an item for item definition, budget definition, and vendor negotiation.

16 Claims, 11 Drawing Sheets

C

| Dept | Class | Description | Quantity | Unit Price | Color | Size |
|---|---|---|---|---|---|---|
| Women's Apparel | Skirts | Plaid Skirt | 50 | $4.50 | red | Small |
| Women's Apparel | Skirts | Plaid Skirt | 100 | $4.50 | red | Medium |
| Women's Apparel | Skirts | Plaid Skirt | 100 | $4.50 | red | Large |
| Women's Apparel | Skirts | Plaid Skirt | 50 | $4.50 | red | X-Large |
| Women's Apparel | Skirts | Solid Skirt 1 | 50 | $4.00 | black | Small |
| Women's Apparel | Skirts | Solid Skirt 1 | 100 | $4.00 | black | Medium |
| Women's Apparel | Skirts | Solid Skirt 1 | 75 | $4.00 | black | Large |
| Women's Apparel | Skirts | Solid Skirt 1 | 25 | $4.00 | black | X-Large |
| Women's Apparel | Skirts | Solid Skirt 2 | 50 | $4.00 | blue | X-Small |
| Women's Apparel | Skirts | Solid Skirt 2 | 75 | $4.00 | blue | Small |
| Women's Apparel | Skirts | Solid Skirt 2 | 75 | $4.00 | blue | Medium |
| Women's Apparel | Skirts | Solid Skirt 2 | 50 | $4.00 | blue | Large |
| Women's Apparel | Skirts | Denim Skirt | 100 | $4.75 | blue | Small |
| Women's Apparel | Skirts | Denim Skirt | 200 | $4.75 | blue | Medium |
| Women's Apparel | Skirts | Denim Skirt | 100 | $4.75 | blue | Large |
| Women's Apparel | Skirts | Maxi Skirt 1 | 50 | $6.20 | yellow | Small |
| Women's Apparel | Skirts | Maxi Skirt 1 | 50 | $6.20 | yellow | Medium |
| Women's Apparel | Skirts | Maxi Skirt 1 | 50 | $6.20 | yellow | Large |
| Women's Apparel | Skirts | Maxi Skirt 1 | 50 | $6.20 | yellow | X-Large |
| Women's Apparel | Skirts | Maxi Skirt 2 | 25 | $6.20 | green | X-Small |
| Women's Apparel | Skirts | Maxi Skirt 2 | 25 | $6.20 | green | Small |
| Women's Apparel | Skirts | Maxi Skirt 2 | 50 | $6.20 | green | Medium |
| Women's Apparel | Skirts | Maxi Skirt 2 | 25 | $6.20 | green | Large |
| Women's Apparel | Skirts | Maxi Skirt 2 | 25 | $6.20 | green | X-Large |
| Women's Apparel | Skirts | Floral Skirt | 50 | $5.95 | pink | Small |
| Women's Apparel | Skirts | Floral Skirt | 100 | $5.95 | pink | Medium |
| Women's Apparel | Skirts | Floral Skirt | 50 | $5.95 | pink | Large |

ASSORTMENT PLANNING DATA MANAGEMENT

TECHNICAL FIELD

The present disclosure relates to management of assortment planning information. More particularly, the present disclosure is directed to methods and systems for sharing product information between multiple systems during the assortment planning and product negotiation processes.

BACKGROUND

Many retailers typically negotiate with vendors before agreeing to offer a product for sale in the retail enterprise. In some negotiations, multiple different attribute values of the product are negotiated including things such as where the product will be manufactured, what port the product will be shipping from, the number of items in the product, the dimensions of the product, the colors of the product, what the product will be made from, the cost associated with shipping the product, the per item cost of the product and so forth.

Computing systems can facilitate these interactions between a retailer and vendor. However, often negotiations are often accomplished by way of exchanging various spreadsheets, with version control being a critical issue in terms of the item attributes and sales terms that are negotiated. Still further, as a negotiation occurs, each party to the negotiation may have shifting access rights to modify particular parameters of an agreement, which might affect product attributes, supply timing, or other terms of sale.

Such concerns are further heightened in circumstances where a retailer may wish to have a stronger hand in product design. In such cases, both the retailer and the prospective vendor may wish to define product attributes during the negotiation. These various needs typically result in disparate tools being used to conduct vendor-retailer negotiations. Where various other computing systems rely on the information regarding negotiations in order to properly plan for product assortments or budgets, complexity is added, due at least in part to the disparate negotiating documents typically employed in such negotiations.

SUMMARY

In general terms, the present disclosure relates to methods and systems of planning assortments of items for a retail enterprise. More particularly, the system is focused on managing item data and sharing that data between various software tools used in the item negotiation and planning process.

At least one aspect of the present disclosure is directed to a common item data management system. The system includes an item records data store, a processing device, and a memory device comprising instructions. When executed by the processing device, the following operations are performed: receive input initiating creation of an item record; save the item record to the item records data store; receive attribute information for an item corresponding to the item record from a first computing device; save the attribute information to the item record in the item records data store; receive a request for the item record from a second computing device; determining permissions for the second computing device relative to the attribute information of the item record; communicating permitted attribute information to the second computing device; receiving updated attribute information for the item record from a third computing device; and saving the updated attribute information to the item record.

In another aspect, a method of managing assortment planning information comprises: (a) receiving input at a common item data management system to create an item record; (b) saving the item record in an item records data store; (c) receiving at least one item attribute for an item associated with the item record; (d) saving the at least on item attribute with the item record; (e) communicating the at least one item attribute of the item record to a product negotiating tool; (f) receiving updated item attributes for the item from the product negotiating tool; (g) recording the updated item attributes with the item record; (h) repeating steps (c) to (g) until all desired attributes are recorded to the item record; and (i) locking the item record.

In yet another aspect, an assortment planning system is provided. The assortment planning system includes: a common item data management server storing a plurality of item records, each of the plurality of item records having a plurality of item attributes; an assortment planning tool communicatively connected to the common item data management system, the assortment planning tool presenting an assortment planning user interface, the assortment planning user interface including a plurality of fields in which an assortment of a plurality of items and item types are defined; a product negotiation tool communicatively connected to the common item data management server, configured to provide a buyer user interface and a vendor user interface each useable to view selected item records from the common item data management system, wherein an assortment plan defined using the assortment planning user interface is associated with the item records on a one-to-many basis; wherein the plurality of item records are viewable by a buyer via the buyer user interface, the buyer user interface allowing the buyer to initiate a negotiating process with one or more vendors regarding one or more of the plurality of item records; and wherein the one or more of the plurality of item records is accessible to the vendor such that a first subset of item attributes is viewable by the vendor and a second subset of item attributes selected from among the first subset of item attributes is modifiable by the vendor via the vendor user interface.

DETAILED DESCRIPTION

Figure 1:
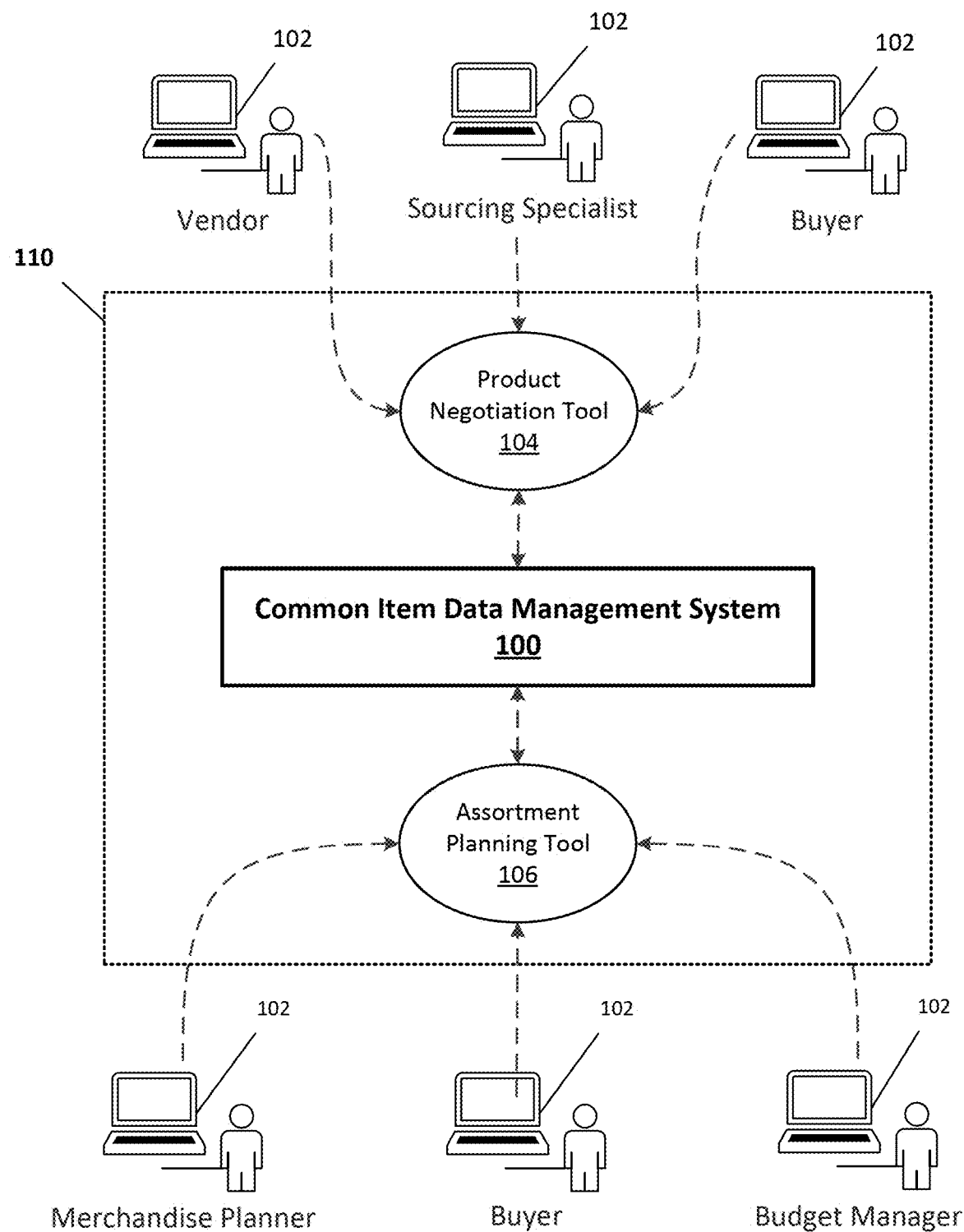
FIG. 1 illustrates a schematic diagram of an assortment planning system.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

The software system described herein centers around a common item planning and data management system that stores information about items throughout the item planning and negotiation process. In some embodiments, the system includes a multi-use tool for assortment planning that allows for flexible data sharing across the lifecycle of an item for item definition, budget definition, and vendor negotiation. In some embodiments, this software system includes an assortment planning tool and a negotiation tool. In some embodiments, additional planning tools such as a budgeting tool can be included. Each of the computing tools that are used to update and access item information are cross-linked via a common data management system. Records for each item are stored at the common data management system.

Changes to an item record received from one tool can initiate changes that are pushed out to another tool. For example, changes to item attributes or costs based on a vendor negotiations are automatically reflected in an overall lineplan, which includes an item assortment in a particular pyramid or division or department, and also reflected in an overall budget for the particular lineplan or department. Thus, one single record exists in the common data management system for each item. The item record serves as a single source of truth for item information that can be accessed by various tools within a retail enterprise.

The planning toolset described in the present disclosure has the advantage of providing near-realtime insight within a retail enterprise across inventory planning, financial planning, and buying/negotiation as those processes evolve due to changes in business circumstances. For example, an item plan may evolve, affecting overall budget and the types of items or item attributes that would be negotiated. Changes in item definition or cost due to item negotiations between a buyer and a vendor may be reflected in the overall inventory plan and overall budget. Changes in overall budget may be visible to item/inventory planners to identify other items with which financial performance may be achieved, and may affect particular item negotiations.

To accomplish this, a single item record is shared across all of these tools, and may be modified or enhanced as part of the item planning, negotiation, budgeting processes. Item attributes may be initially set during planning, and changed during negotiation. Item costs may be set during planning and budgeting, but may be adjusted during negotiation as well. Negotiations may also affect changes to item records as a negotiation takes place (e.g., amounts of an item and therefore overall profitability, item attributes affecting the overall item selection, etc.). Any assumptions based on particular item attributes would therefore be automatically reflected in the various tools used by a retail enterprise's different user bases. This avoids different user populations performing decision-making with out-of-date data due to changes in an inventory plan, negotiation, or financial plan. Additionally, at different phases in the item negotiation process, different entities may have access to edit different attributes included in the item record, with control over each aspect of the item record being managed individually and changeable at each defined stage within the item negotiation process.

FIG. 1 illustrates a schematic diagram of a computing environment in which a common item data management system 100 operates. The common item data management system 100 operates to manage information during and after a product negotiation process. Users can access product information saved in the common item data management system 100 via computing devices 102. Generally, the users are operating the computing devices 102 to access other computing systems that serve particular purposes and access the information from the common item data management system 100 to perform those functions. As shown in FIG. 1, multiple different users can access the common item data management system 100 using a computing device 102. In this example, a vendor, a sourcing specialist, and a buyer are shown accessing information in the common item data management system 100 via the product negotiation tool 104. A merchandise planner, a buyer, and a budget manager are accessing information in the common item data management system 100 via the assortment planning tool 106.

In the example of FIG. 1, the common item data management system 100 is in communication with a product negotiation tool 104 and an assortment planning tool 106 (collectively referred to as "computing tools"). As a whole, the common item data management system 100 and its associated tools comprise an assortment planning system 110. In some embodiments, the common item data management system 100 is in communication with more than two assortment planning tools 106. In some embodiments, the common item data management system 100 is in communication with at least three different computing devices. In some embodiments, the common item data management system 100 is in communication with more than 5 different computing devices. The common item data management system 100 is described in further detail with respect to FIG. 2.

The product negotiation tool 104 operates to mediate communications between vendors and buyers during product negotiations. A buyer or sourcing specialist for a retailer operates a computing device 102 to prepare a request for products from one or more vendors. The request includes desired attributes of those products. A vendor operating a computing device 102 responds to the request by providing further attributes of products that the vendor can provide to the buyer. As attributes for products are input and changed by the computing device 102 operated by the vendor and buyer, the product negotiation system 104 updates item records in the common item data management system 100 to reflect the most up-to-date information about the products being negotiated.

In some embodiments, the product negotiation tool 104 is configured to provide a buyer user interface and a vendor user interface, both of which are usable to view selected item records from the common item data management system 100. The product negotiation tool 104 mediates the negotiation over product/item sales between buyers and vendors. For example, and as alluded to above, the product negotiation tool 104 may, on combination with the common item data management system 100, control view and/or edit access to item records maintained by the common item data management system 100 to assist with controlling an item specifying and item purchase process among a buyer and vendor, while optionally allowing read and/or supervisory access to other interested parties, such as a merchandise planner and/or budget manager. In some embodiments, the plurality of item records in the common item data management system 100 are viewable by a buyer via the buyer user interface. The buyer user interface allows the buyer to initiate a negotiating process with one or more vendors regarding one or more of the plurality of item records. In some embodiments, the plurality of item records are accessible to the vendor and are made up of two subsets of item attributes. A first subset of item attributes is viewable by the vendor and a second subset of item attributes selected from the first subset of item attributes is modifiable by the vendor via the vendor user interface.

While the above reflects a general operational description of a product negotiation system 104, additional details regarding one possible example of a product negotiation system 104 is described in U.S. patent application Ser. No. 15/963,723, entitled "Item Database Creation Based on Negotiated Values", the disclosure of which is hereby incorporated by reference in its entirety.

Although the above-incorporated application describes a database that may have records created by a buyer and vendor negotiation, it is noted that such a system may nevertheless lack information regarding a desired product plan or financial plan associated with such a negotiation, which may be received via, e.g., the assortment planning tool 106. Accordingly, and as noted below, the assortment planning system 110 integrates additional users and perspectives at a single source of truth for item data as items are defined for inclusion in an assortment during all phases of assortment planning from initial financial planning through completed negotiation with vendors in a single, seamless experience.

The assortment planning tool 106 operates to assist merchandise planners, buyers, and/or budget managers in planning which types and quantities of items will be presented for sale at a retailer. The items could be for sale at a physical retail store or available for sale online. In some embodiments, the assortment planning tool 106 is used to determine which items will be stocked at particular retail locations within a chain of retail stores. The assortment planning tool 106 can operate at various levels of granularity. For example, the planning could occur at the entire retail chain level, individual store level, chain-wide department level, item class, etc.

The assortment planning tool 106 draws upon item information in the common item data management system 100. In some embodiments, the assortment planning tool 106 presents an assortment planning user interface to a merchandise planner within a retail organization. The user interface could be configured to present a plurality of fields in which an assortment of a plurality of items and item types are defined. In some embodiments, the assortment plan defined using the assortment planning user interface is associated with the item records on a one-to-many basis. In some embodiments, the assortment planning tool 106 is configured to present a financial planning user interface usable to define financial goals for an assortment plan that are propagated to each of the item records.

In general, the assortment planning tool 106 may be used to define general categories or types of items, as well as particular desirable item attributes to be included in an item that is desired for an item assortment. In some instances, the desirable item attributes may include a desired price range and desired particular item attributes for one or more products in an assortment. In some instances, a merchandise planner may wish to define specific item attributes for a particular item; in other instances, the merchandise planner may wish to only enter a small portion of attributes of an item, allowing another entity (e.g., a buyer acting on behalf of the retailer) to further define item attributes during a negotiating process. In general, and as discussed further below, use of the common item data management server 100 allows for flexible definition of item and purchase attributes by any of a variety of interested entities.

In some embodiments, the assortment planning tool 106 operates to assist budget managers or merchandise planners in making financial plans for a retail enterprise. In general, the assortment planning tool 106 may allow a financial planner to define general financial goals for particular departments, classes of items, or subclasses of items, into which an assortment planner may provide item attributes to meet those financial goals. Information such as general profit margin, budget, historical costs, and other types of information may be provided via the tool 106. In some embodiments, there could be a financial planning tool separate from the assortment planning tool 106 that is dedicated to managing budgets.

As discussed above, the use of a product negotiation tool 104, assortment planning tool 106, and financial planning tool by respective merchandise planners, buyers, and/or budget managers is controlled to allow different levels, roles, and timing of access to underlying data based on the specific roles of users. For example, while a financial planner may have top-level access to view product assortment, pricing, and can set pricing and product margins, a financial planning tool will generally not be useable to negotiate with vendor for fulfillment of specific items. Additionally, the product negotiation tool 104, used by buyers or other fulfillment team members, may be useable for direct negoaition with vendors, it is not used to set a top-level budget for a product line or department, and may not, in many instances, allow access to such information, su that type of sensitive information is not inadvertently exposed to external vendors. Furthermore, the assortment planning tool may also allow higher-level access to product line plans, but will not be exposed externally to vendors. As discussed herein, tools that provide different sets of access and editing rights, and are used by individuals having different roles within an organization, are linked together using a common record. This allows for realtime views on overall business plans that are provided at appropriate levels of exposure to those individuals without requiring duplication of records across applications.

Although a particular collection of systems is described which access the common item data management server 100, it is recognized that the present disclosure is not so limited. Rather, other types of systems and interested entities may be authorized to access the system 100 for purposes of viewing or providing input regarding an item assortment planning process.

Figure 2:
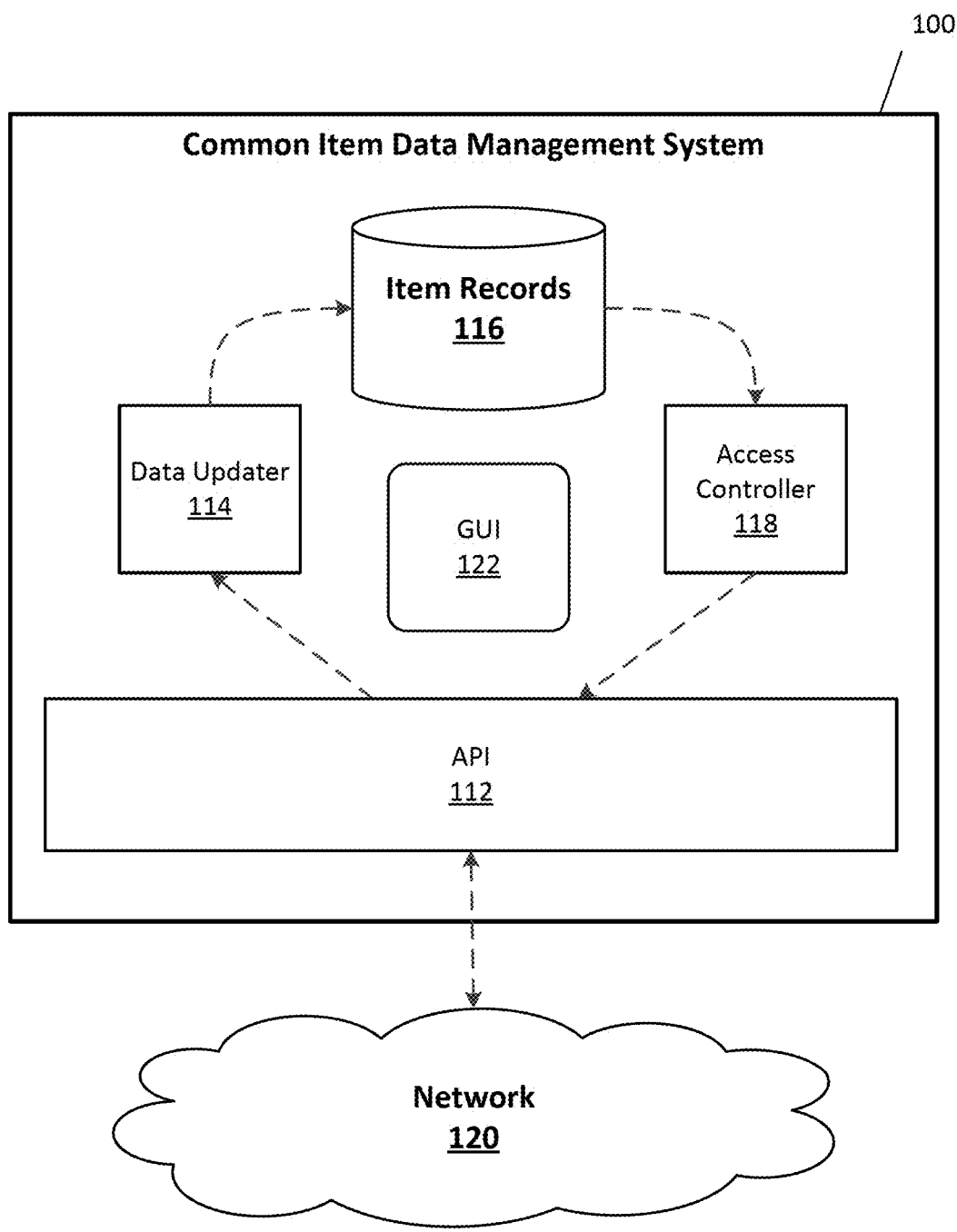
FIG. 2 illustrates a schematic diagram of the common item data management system of FIG. 1

FIG. 2 illustrates a more detailed schematic diagram of the common item data management system 100. In this example the common item data management system 100 is in communication with other systems and tools via the network 120. In this example, the common item data management system 100 includes an application programming interface (API) 112, a data updater 114, an item records data store 116, an access controller 118, and a graphical user interface (GUI) 122.

The API 112 operates to mediate communications between the common item data management system 100 and external computing systems such as the product negotiation tool 104. Computing systems and tools that wish to utilize the item record information can call to the API 112 to request that information be fetched from the item records data store 116. The retrieved information is presented back to the computing system or tool by the API 112. Essentially, the API 112 serves as an intermediary, translating computer language between the different computing systems.

The data updater 114 operates to add, edit, and delete information in the item records data store 116. The data updater 114 receives new information through the API 112 that can be received a planning tool or computing device 102. The data updater 114 may be implemented, for example, when updates to assortment plans are received from an assortment planning tool 106 or when new item attributes are received for an item record from the product negotiation tool 104. Additionally, if new items are set up, the data updater 114 adds new item records to the item records data store 116.

The access controller 118 operates to mediate access to information in the item records data store 116. In response to requests for information received through the API 112 from other systems and tools, the access controller 118 retrieves information from the item records data store 116, determines which pieces of information the requesting system or tool has permission to access, and communicates the pieces of information to the system or tool through the API 112.

The GUI 122 operates to present information relevant to assortment planning, financial planning, and product negotiation. Different views present different sets of information and different options for adding or editing data. For example, one view could present item record information to a buyer relevant to ongoing product negotiations with vendors. Another view could present item record information for a whole segment of products in order for a merchandiser to plan an item assortment for a given time period. Example displays of the GUI are provided in FIGS. 6-10.

The common item data management server 100 serves as a single source of truth for information about items and associated item attributes that are in the product negotiation and assortment planning processes. The item records data store 116 is the control location where this data is stored before the item is set up for actual use and sale in a retail enterprise. In other words, planning tools such as the product negotiation tool 104 and assortment planning tool 106 access item attribute and negotiation information from the common item data management server 100, to ensure source control and access/modification controls are managed appropriately.

There are various ways the data could be structured to establish the single source of truth. In some embodiments, the computing tools utilize pointers to access the most up to date information from the item records data store 116. In some embodiments, the planning tools subscribe to updates from the item records data store 116 in order to update their own records for purposes of operating their own respective software programs.

In some embodiments, the common item data management server 100 operates to update item records in real-time or near real-time. In some embodiments, updates to the item records in the item records data store 116 can be pushed out to planning tools that subscribe to the information updates. In some embodiments, the computing tools periodically request data updates (pulls) from the common item data management server 100.

Figure 3:
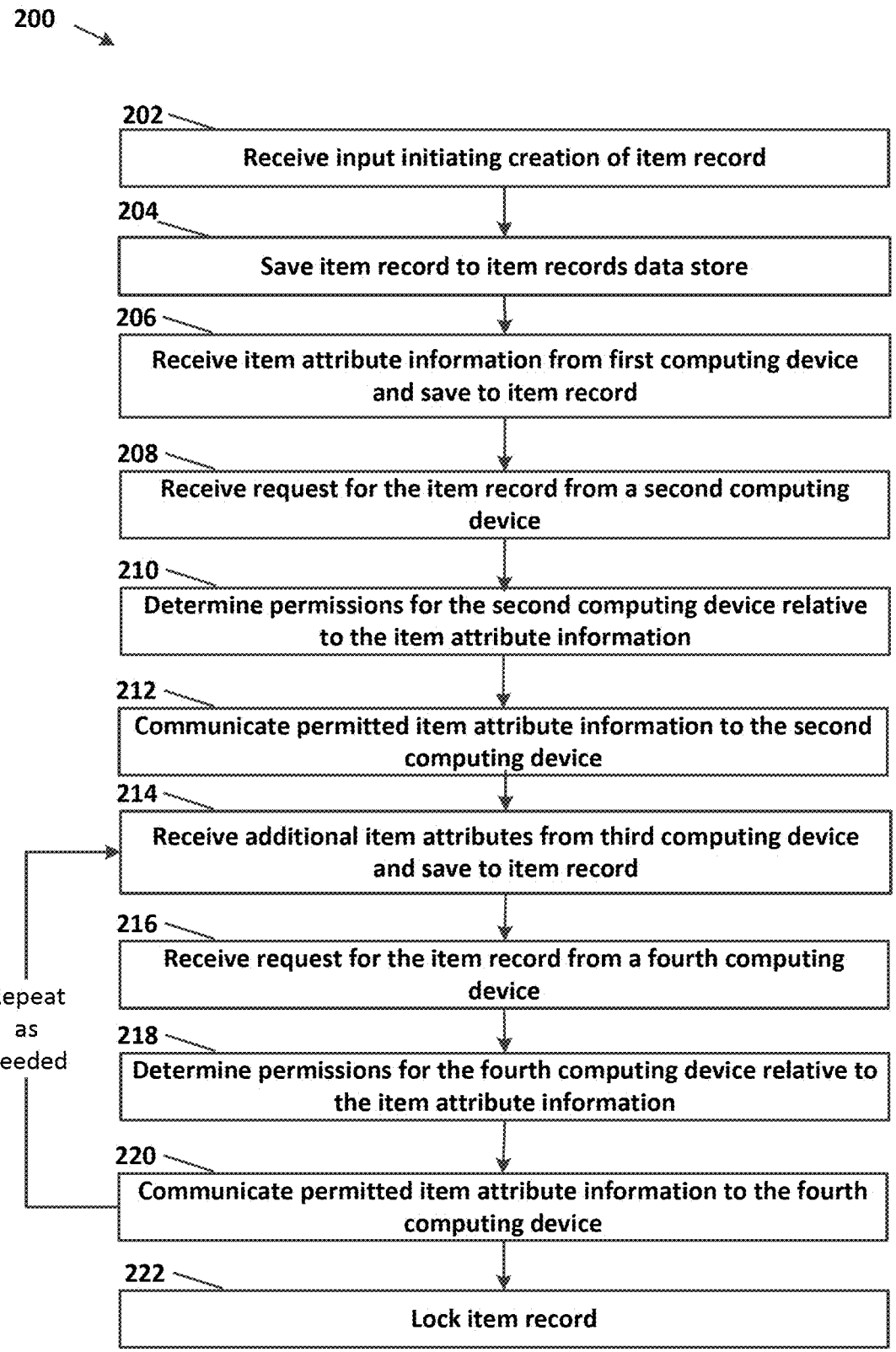
FIG. 3 is a flow chart of an example method of managing item data.

FIG. 3 is a flow diagram of an example method 200 of managing item data. In some embodiments, this method 200 is performed by the assortment planning system 110 of FIG. 1. The method may be performed after, for example, a merchandise planner has identified a particular item or item type for purchase and a budget is set, for example, using a financial planning tool as in FIG. 1.

At operation 202, input is received initiating creation of an item record. [LH1][Ke2][Ke3] In some embodiments, the input is received from a buyer computing device 102 or vendor computing device 102 to initiate the product negotiation process. In some embodiments, the input is received from a computing device via the assortment planning tool 106. For example, if a particular item or item type is desired, a merchandise buyer or planner may create one or more item records for general item types using an assortment planning tool 106, with those records being managed within the common item data management server 100 for negotiation between the buyer and vendor. In particular a single item or item type record created using assortment planning tool 106 may result in one or more item records being created, for example due to a requirement or request to negotiate and purchase items from a vendor in multiple sizes, colors, or other variations.

At operation 204, the item record is saved to an item records data store. The item record is stored in the common item data management system 100. Input is received through the network 120 via an API 112. The data updater 114 converts the input into data that is stored in a single record for each item in the item records data store 116.

At operation 206, item attributes are received from a first computing device. In some embodiments, a user enters one or more attributes for a new item on a computing device 102 using a graphical user interface. The attributes could be selected from a menu of available attribute categories and attribute values. In some embodiments, the attributes can be entered manually. In some embodiments, the user has significant flexibility in choosing categories and values of attributes in order to customize each item record to different types of items. The attributes for the item are received at the common item data management system 100 where they are saved to the item record. In some embodiments, the data updater 114 receives the attribute information through the API 112 and saves the information to the item records data store 116.

At operation 208, a request for the item record is received from a second computing device. Generally, this would be a different computing device from the first computing device. For example, if the first computing device was operated by a buyer, a vendor may operate the second computing device to access information about the item in order to provide a bid.

At operation 210, the access controller 118 determines which permissions the second computing device has relative to the item attribute information that has been requested. For example, if the second computing device is being operated by a vendor, the access controller 118 may determine that some attribute information cannot be communicated to the second computing device. This may include, for example, financial terms, specific details regarding volumes required, or other sensitive information that would not necessarily be shared with a vendor at this stage in an item negotiation. In some embodiments, some attributes for an item are locked such that the vendor cannot change the attribute values. These may be, for example, attributes that are considered non-negotiable by the merchandise planner or buyer, but which are required to be conveyed to the vendor.

At operation 212, the permitted item attribute information is communicated to the second computing device. In some embodiments, the item attributes for a given item are presented on a graphical user interface designed specifically for type of user operating the second computing device.

At operation 214, additional item attributes are received from a third computing device and are saved to the item record. In some embodiments, the third computing device is the same as the first computing device. In some embodiments, the third computing device is the same as the second computing device. For example, after a vendor receives attribute information in the previous step, the vendor decides to provide some updated attribute information for the same item. The vendor inputs the updated item attribute information into their computing device and it is communicated to the item record. In some instances, the item attributes are provided by a vendor in response to a buyer request. In other instances, the item attributes are added by the buyer or an assortment planner as details of an assortment plan are worked out. It is noted that one or more negotiation rounds may be moderated by the product negotiation tool 104, with access to data at the common item data management server 100 being coordinated to ensure that only the entity preparing its offer/counteroffer or design inputs may have edit access to those particular attributes that it may have the right to modify.

At operation 216, another request for the item record is received from a fourth computing device. The fourth computing device could be the same as the first, second, or third computing devices.

At operation 218, the access controller 118 determines permissions for the fourth computing device relative to the item attribute information.

At operation 220, permitted item attribute information is communicated to the fourth computing device.

The process can return to operation 214 to repeat as needed until all desired item record information is recorded in the item record data store 116. Once the attributes for the item have been agreed upon and input into the common item data management system 100, the method proceeds to operation 222 where the item record is locked. No further changes can be made to the attribute information. However, computing devices can still request to view permitted attribute information for the item.

In some embodiments, the method 200 is very iterative. Multiple rounds of adding and editing attributes for each item record could occur before item definition is complete for a given item. In some embodiments, updates are pushed out automatically to other aspects of financial or assortment plans according to updates to item attributes. In some embodiments, external systems can request updated information through an API from the item record data store. In some embodiments, the requests can occur automatically to pull information on a regular basis. In some embodiments, as attributes and plans change, the latest updates are highlighted so users can easily distinguish the new information from the old when viewing the GUI 122.

Figure 4:
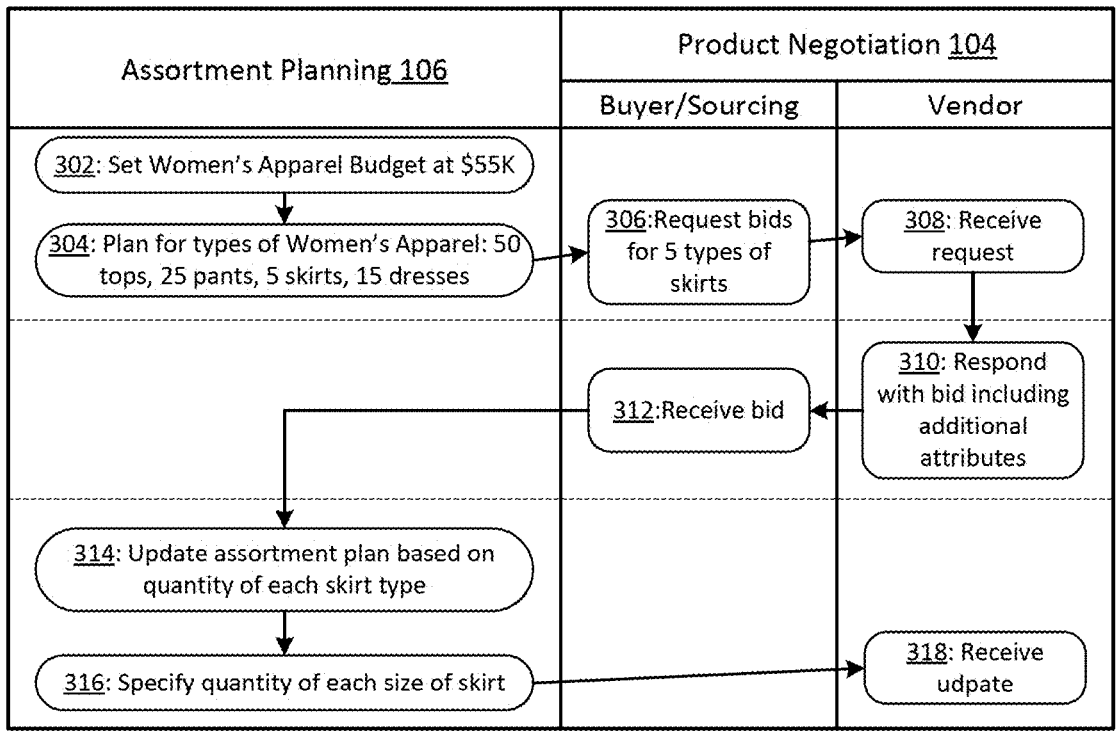
FIG. 4 illustrates a swimlane diagram of an example process of managing attribute information for a group of items.

FIG. 4 illustrates a swimlane diagram 300 for one example process [LH4][Ke5] of managing attribute information for a group of items. Tables (330, 332, 334) representing item records are matched to phases of the process (A, B, C).

Phase A begins with operation 302 performed by the assortment planning tool 106. The women's apparel budget is set at $55,000 for the season. Relevant particulars of the budget are saved in the item records data store 116.

At operation 304, plans for the types and quantities of women's apparel are made at the assortment planning tool 106 based on the available budget information. In this example, the assortment plan calls for 50 types of tops, 25 types of pants, 5 types of skirts, and 15 types of dresses. This information is saved in the item records data store 116. If the products are all new, a new item record is created for each category of item and includes attribute information available at the time for that item. An example of the item records corresponding to the 5 skirts is shown in the table 302 labeled "A". Each row represents a single item record. Each column represents a different category of item attribute. In this example, the table 302 includes 5 rows for the 5 types of skirts. The table 302 has 5 columns: Dept (department), Class, Description, Quantity, and Unit Price. So far only the Dept, Class, and Description columns have values for each of these 5 item records.

At operation 306, a buyer or sourcing specialist requests bids for 5 types of skirts via the product negotiation tool 104. The request is input via a GUI and is communicated to a plurality of vendors through the product negotiation tool 104. As noted above, a merchandise planner may have created item records for particular items via an assortment planning system 106; however, those item records remain available for use by a buyer, directly within the same system. The buyer may then initiate a negotiation/bidding process with one or more vendors associated with those items.

At operation 308, the vendor(s) receive the request from the product negotiation tool 104. The vendors can view at least some of the attribute information for the items on a GUI based on a set of permissions. The permissions determine which attributes can be viewed and edited by vendors. For example, while the vendor may see a particular one or more skirts that they are bidding on, they may not be able to see a full product selection that will be offered by the retailer may not have insight into overall budget and/or profit margin information provided via the financial planning system 108 and assortment planning system 106.

Moving on to phase B, the vendor responds to the bid at operation 310. The response includes additional attributes of the items being negotiated. These attributes are more specific, thus breaking up previous individual item records into multiple item records having more detailed attributes. In this example, the vendor supplies attribute values for quantity and unit price of each item, as shown in table 332. Additionally, a new column is added for color and a color value is supplied for each type of skirt. The description of the skirts has also been updated to be more descriptive.

At operation 312, the buyer receives the bid via the product negotiation tool 104 and views the updated item information on the GUI.

Operation 314 moves the process into phase C. The assortment plan is updated at the assortment planning tool 106. In some embodiments, updates to various aspects of the assortment plan are automatically updated in response to the updates to the item records. In some embodiments, an assortment planner may request to view the item records and then make decisions to adjust the assortment plan accordingly. In this example, an adjustment to the assortment plan is made based on the quantity of each skirt that was bid on by the vendor.

At operation 316, a desired quantity of each size of each type of skirt is specified. The specifications are input via the GUI and are communicated to the vendor via the product negotiation tool 104. Table 334 reflects the current status of the item records based on the product negotiation process. Again, the item records have been split into multiples based on the more detailed attribute information supplied by the buyer. Specifically, each type and color of skirt has been further broken down by size.

Referring to FIG. 4 overall, as information is filled in by way of the negotiation between the buyer and vendor, a status of an overall assortment plan may be visible to a merchandise planner and/or budget manager, e.g., by allowing those individuals to view the data records or any changes in price/budget that may occur during the item negotiation process. Additionally, referring to FIGS. 3-4, it is apparent that the item data records may be planned at a different level of specificity than is used in a buyer-vendor negotiation. For example, while an item in an essentials or beauty category may be planned by a merchandise or assortment planner at the item level, apparel may not be planned at the item level, but instead at an item line level, with details regarding number and assortment of sizes and/or colors, or specific apparel design traits, being managed by a buyer. Accordingly, one-to-one and one-to-many relationships between an assortment plan and the individualized item records that are populated into the assortment planning system 110 are managed, with item attributes populated across a plurality of item records where assortments are planned at an item line level (or other non-item level).

Multiple alternatives to the methods described in FIGS. 3-4 are possible. Different roles could be using computing devices with different planning and negotiation tools. Multiple types of attributes and information can be managed by the common item data management server 100. The assortment planning system 110 can be utilized for negotiations between buyers and third party vendors as well as between sourcing and in-house brands. In some instances, the planning and negotiation process occurs in a top-down approach, much like that described in FIG. 4, where an overall financial plan defines the start of the process. In some alternatives, the process for a given item could occur between a vendor and sourcing where details about an item are determined and then an overall financial plan is adjusted accordingly.

In some instances, the negotiations and responsibilities can be passed back and forth between different roles once the top level goals are set. For example, a financial planner sets category goals for an overall item assortment. Individual item financials can be managed by a merchandise planner or buyer. In some embodiments, the financial planner and merchandise planner are one in the same. The buyer starts buying items for the assortment from vendors. Feedback from vendors and the buyer propagates a negotiation board, which is then rolled back up to assortment planning. The buyer works with the assortment planner to determine whether the items have evolved in a way that is now better or worse for the overall assortment. Negotiations may pass back and forth between the vendor and buyer, with the buyer checking in with assortment planning at various points in the process. Then the financial planner may get involved for approval of a viable plan for the item assortment based on an overall budget. Then finally, the buyer completes the process by finalizing details with vendors.

For owned brands, there is more iterating. In some embodiments, a sourcing or procurement team handles negotiations instead of a buyer. The sourcing team may work with a number of vendors to design goods to fall within an overall assortment plan created by a financial planner. The buyer and vendor define specifications for products. As the specifications finalize, they go back to the assortment planner and they can redefine the overall assortment plan because of the change in how different goods look. The assortment plan may be rearranged to meet the segment financial goals based on the revised goods assortment.

The negotiation process with vendors may happen later in the process with owned brands rather than outside brands. For example, sourcing may be negotiating two different dresses with a vendor and may think one is the big seller. Once sourcing gets designs back from the vendor, they may circle back to assortment planning. Sourcing and assortment planner agree to revise the purchases because another of the own brand items looks better from a sales perspective, so they rework the category budget after the item is better defined.

In some embodiments, the planning and negotiation process determines the locations where a given item will be stocked as well as a number of forecasted units for each location for a given time period. In some embodiments, a buyer determines which location will carry a particular item. In some embodiments, a merchandise or financial planner will determine the number of units to stock at each location. As negotiations with vendors occur, planners evaluate whether they can afford a flow of receipts for those items to sell. Planners can tweak the flow of units before finalizing the assortment. Planners can also adjust units from one item to another to refine the financials based on final styles.

Figure 5:
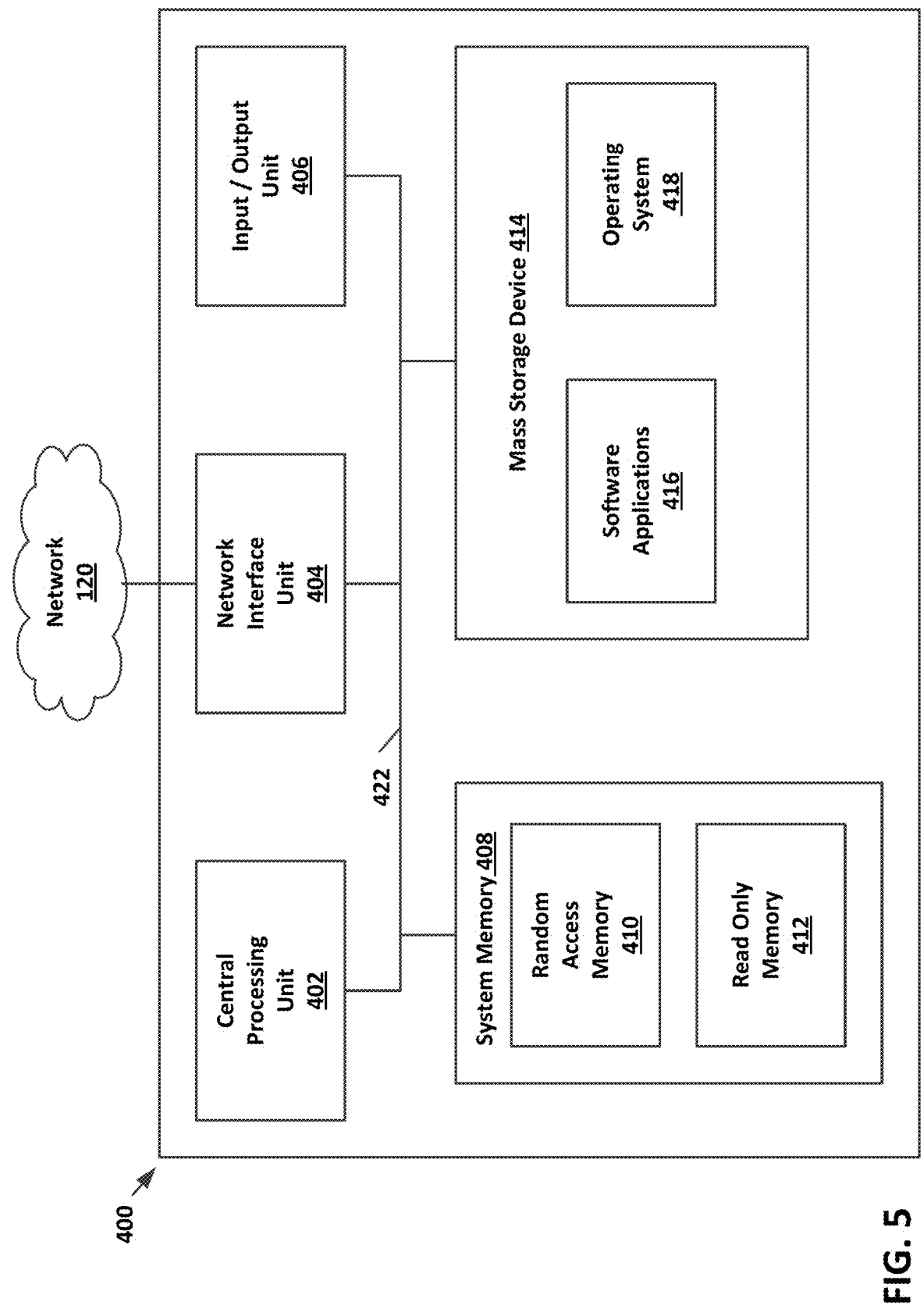
FIG. 5 is a block diagram of a computing system useable to implement aspects of the assortment planning system of FIG. 1.

Referring now to FIG. 5, an example block diagram of a computing system 400 is shown that is useable to implement aspects of the assortment planning system 110 of FIG. 1. For example, the computing system 400 could operate as the computing devices 102 in FIG. 1 or be used to implement various aspects of the common item data management system 100. In the embodiment shown, the computing system 400 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing system 400, such as during startup, is stored in the ROM 412. The computing system 400 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing system 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 400.

According to various embodiments of the invention, the computing system 400 may operate in a networked environment using logical connections to remote network devices through a network 222, such as a wireless network, the Internet, or another type of network. The computing system 400 may connect to the network 222 through a network interface unit 404 connected to the system bus 422. It should be appreciated that the network interface unit 404 may also be utilized to connect to other types of networks and remote computing systems. The computing system 400 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing system 400 can store software instructions and data. The software instructions include an operating system 418 suitable for controlling the operation of the computing system 400. The mass storage device 414 and/or the RAM 410 also store software instructions, that when executed by the CPU 402, cause the computing system 400 to provide the functionality discussed in this document. For example, the mass storage device 414 and/or the RAM 410 can store software instructions that, when executed by the CPU 402, cause the computing system 400 to perform various functions described herein.

Figure 6:
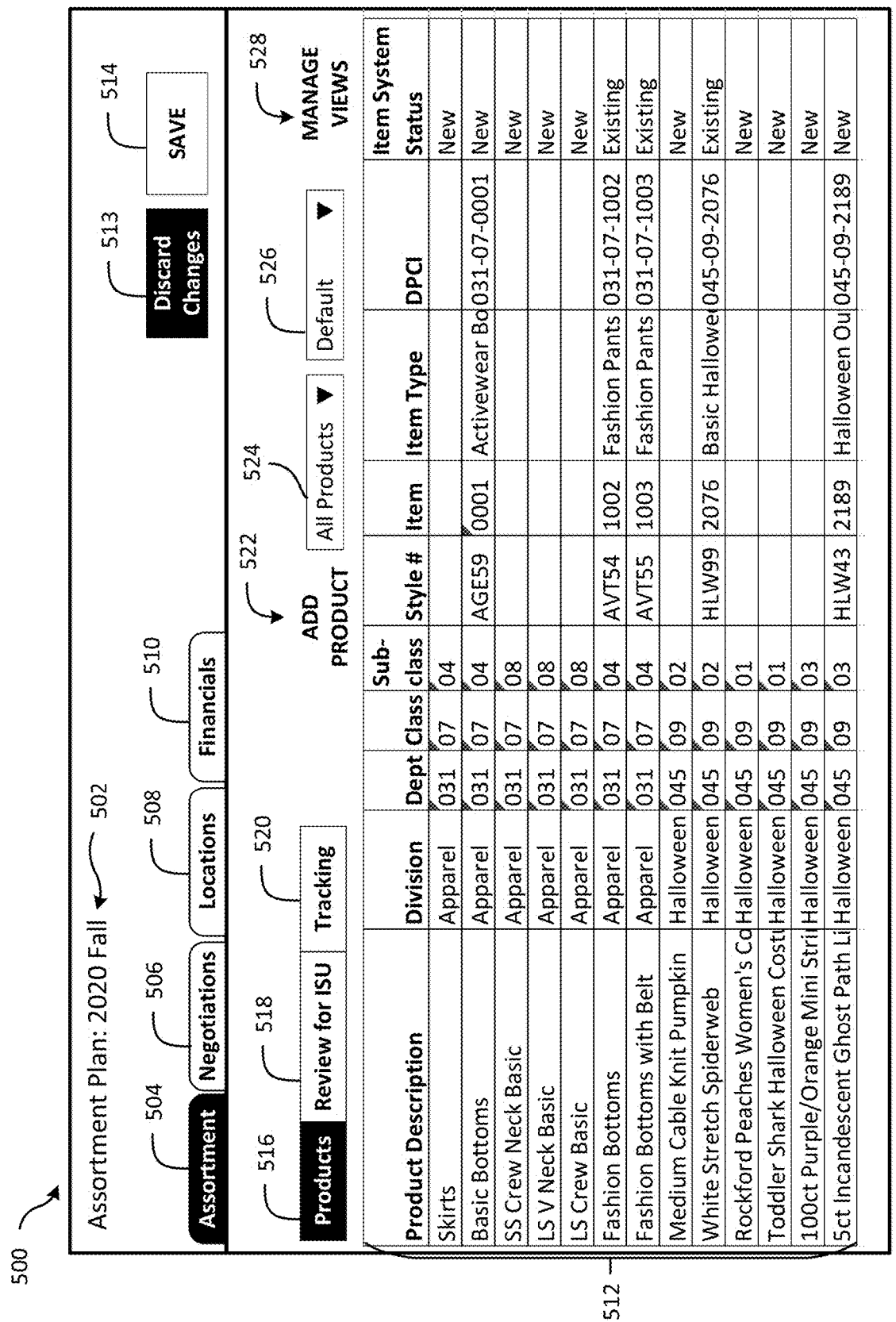
FIG. 6 illustrates an example display of a graphical user interface.

FIG. 6 illustrates an example display 500 of a graphical user interface (GUI) as presented to a merchandiser or buyer. The title 502 indicates that the display 500 is presenting information about an assortment plan for fall of 2020. The GUI is operable to present various options and information regarding products that are being considered for a given product assortment or line plan for a given time period.

A series of tabs (504, 506, 508, 510) are presented at the top of the display 500. Selecting one of the tabs causes a different display of information to be presented. In this example, the tabs include an Assortment tab 504, a Negotiations tab 506, a Locations tab 508, and a Financials tab 510. In the view of FIG. 6, the Assortment tab 504 has been selected.

An item record table 512 shows information about items that is pertinent to assortment planning. Rows of the table represent individual item records. Columns of the table represent various attributes of the items. Cells can be edited by a user of the GUI, which in turn updates item records in the item record data store 116. Selectors offer the option to "Discard Changes" 513 or "SAVE" 514 updates to the item records.

Within the Assortment tab 504 view, selecting different options presents different information pertinent to assortment planning. The options presented on this display 500 include "Products" 516, "Review for ISU" 518, and "Tracking" 520. In this example, the "Products" 516 option has been selected. In this view, additional selectors are presented for options that are relevant to viewing and editing product information. The "ADD PRODUCT" 522 option can be selected to create a new item record corresponding to a new product that is being added to a product assortment. A data selector 524 allows the user to select from a menu of options for displaying product data. In this example, "All Products" will be displayed. A view selector 526 provides options for different ways of displaying the data. In this example, "Default" has been selected. Finally, an option to "Manage Views" 528 can be selected to manage different methods of viewing product information.

The item records table 512, as mentioned above, includes rows representing item records and columns representing various attributes. In the example of FIG. 6, there are columns for the following attributes: Product Description, Division, Dept (department), Class, Sub-class, Style #, Item #, Item Type, DPCI (department, class, item number), and Item System Status. As shown, some fields are not filled in yet for some item records. As information is gathered from various sources, these fields become filled in with information.

Figure 7:
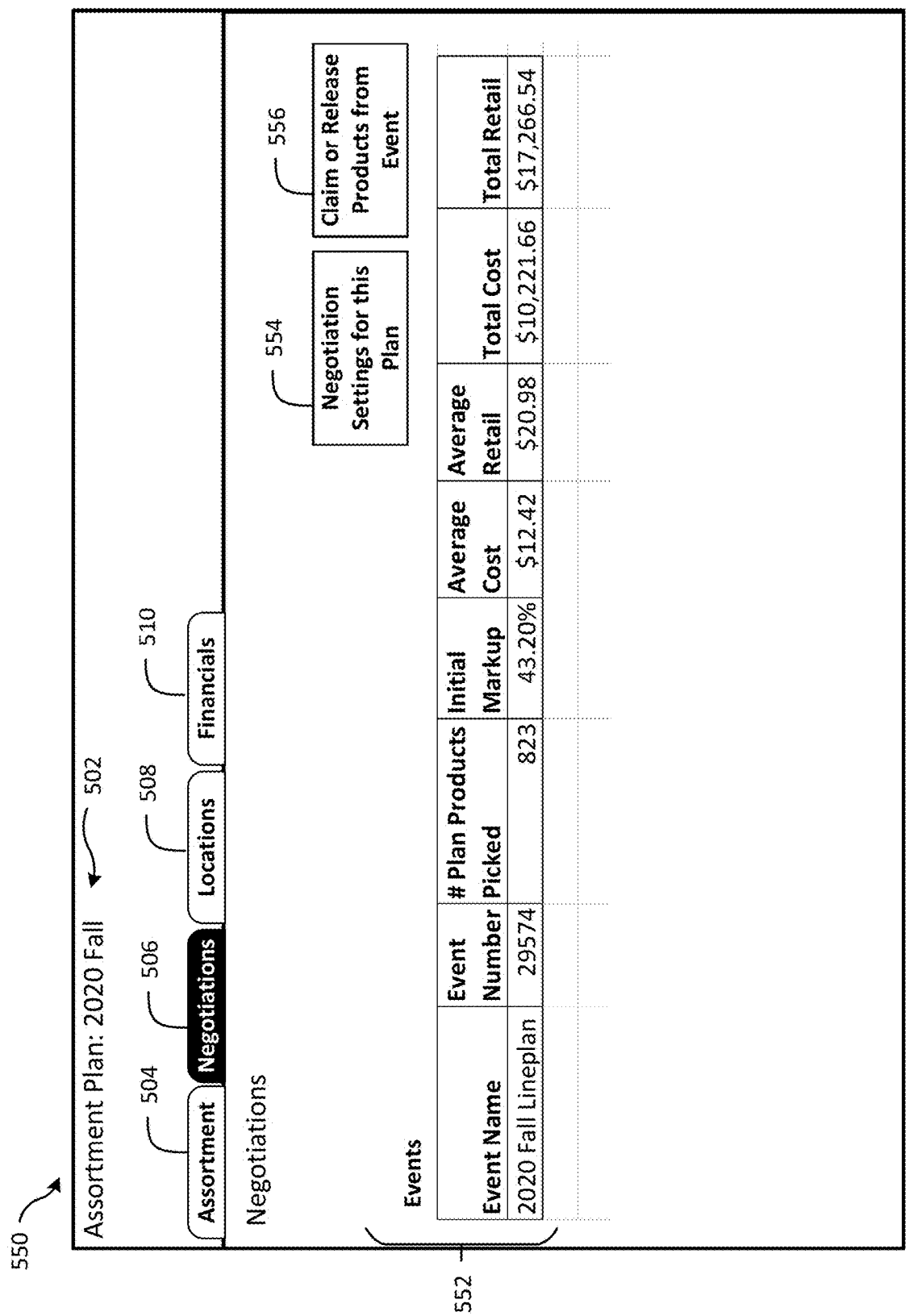
FIG. 7 illustrates another example display of the graphical user interface of FIG. 6.

FIG. 7 illustrates an example display 550 of the GUI as presented to a buyer or sourcing specialist. The Negotiations tab 506 has been selected. Information relevant to ongoing negotiations with vendors are presented to the user. Typically, a different view of the GUI would be presented to the vendors in order to limit access to particular pieces of information. This display 550 shows an overview of various negotiation events that are in progress in the events table 552. In this example, there is only one event: "2020 Fall Lineplan." This view also shows selectors providing options to view and edit "Negotiation Settings for this Plan" 554 and "Claim or Release Products from Event" 556. It is noted that the Negotiations tab may be accessible to a merchandise planner or financial planner, or buyer, but will generally not be available to a vendor using the product negotiation tool 104.

Figure 8:
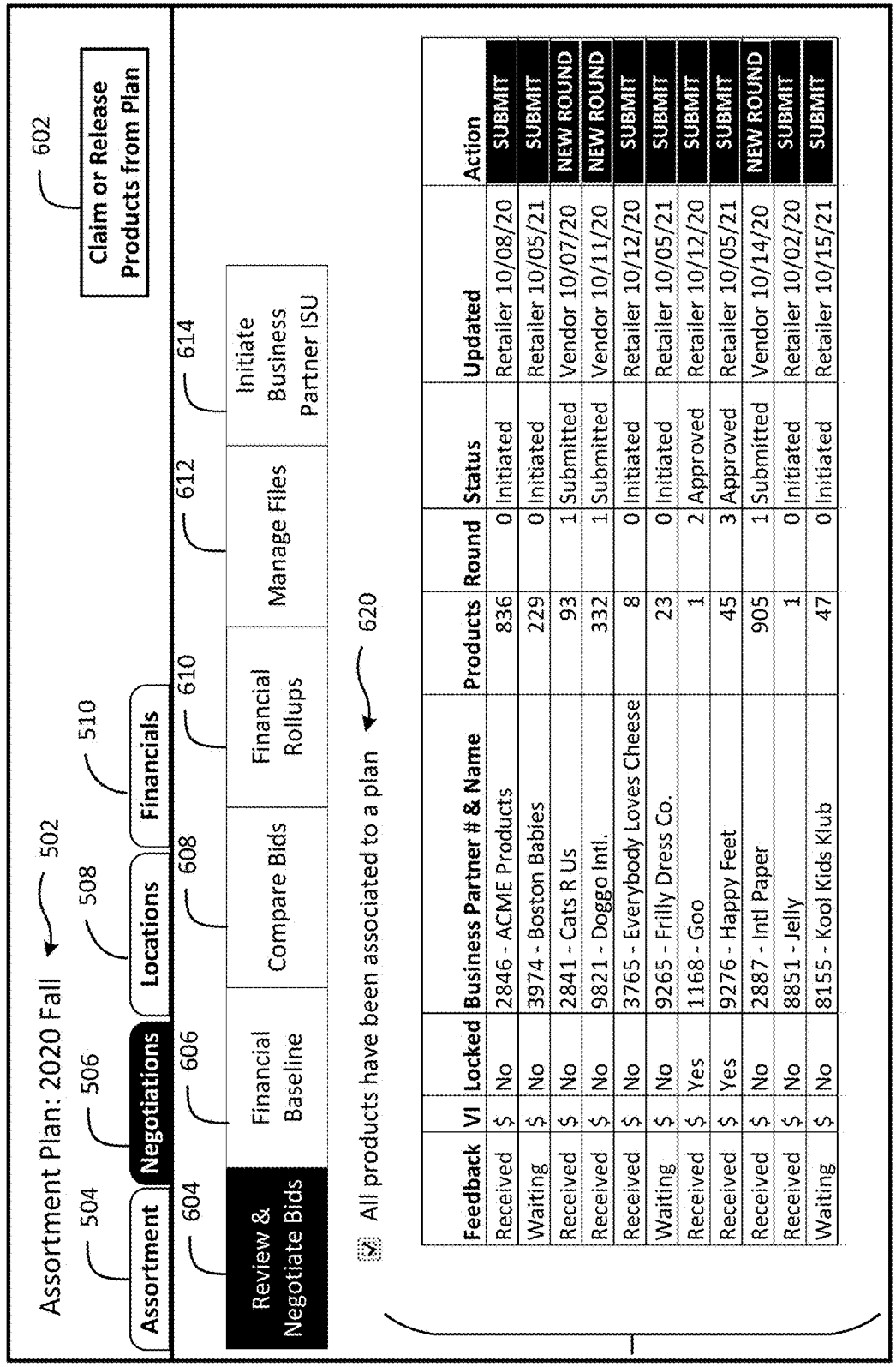
FIG. 8 illustrates another example display of the graphical user interface of FIG. 6.

FIG. 8 illustrates another example display 600 of the GUI as presented to a buyer or sourcing specialist. The display 600 shows information regarding the "2020 Fall" lineplan that was selected from the previous display 550. The Negotiations tab 506 is still selected and the display 600 shows information relevant to product negotiations for 2020 Fall. A selector at the top of the display 600 provides the option to "Claim or Release Products from Plan" 602. A menu of options include selectors for "Review & Negotiate Bids" 604, "Financial Baseline" 606, "Compare Bids" 608, "Financial Rollups" 610, "Manage Files" 612, and "Initiate Business Partner ISU" 614.

In the example of FIG. 8, the "Review & Negotiate Bids" 604 option has been selected. A negotiations table 618 displaying information about a plurality of product negotiations that are in progress with various vendors. Each row of the negotiations table 618 represents individual negotiations with each vendor. Each column of the negotiations table 618 shows different attributes relevant to the negotiation process. The attributes tracked in this example include Feedback, $VI_{[LH6]}$, Locked (whether the negotiated products are locked from more changes being made), Business Partner # and Name, Products (number of products being negotiated), Round (how many rounds of negotiations have occurred), Status (of the negotiation process), Updated (which party last updated the item records and when that update occurred), and Action (presenting selectable options for next actions that can be taken).

The display 600 also includes a checkbox that indicates whether "All products have been associated to a plan" 620. This checkbox is automatically checked when all products in a negotiation have been associated to an assortment plan.

Figure 9:
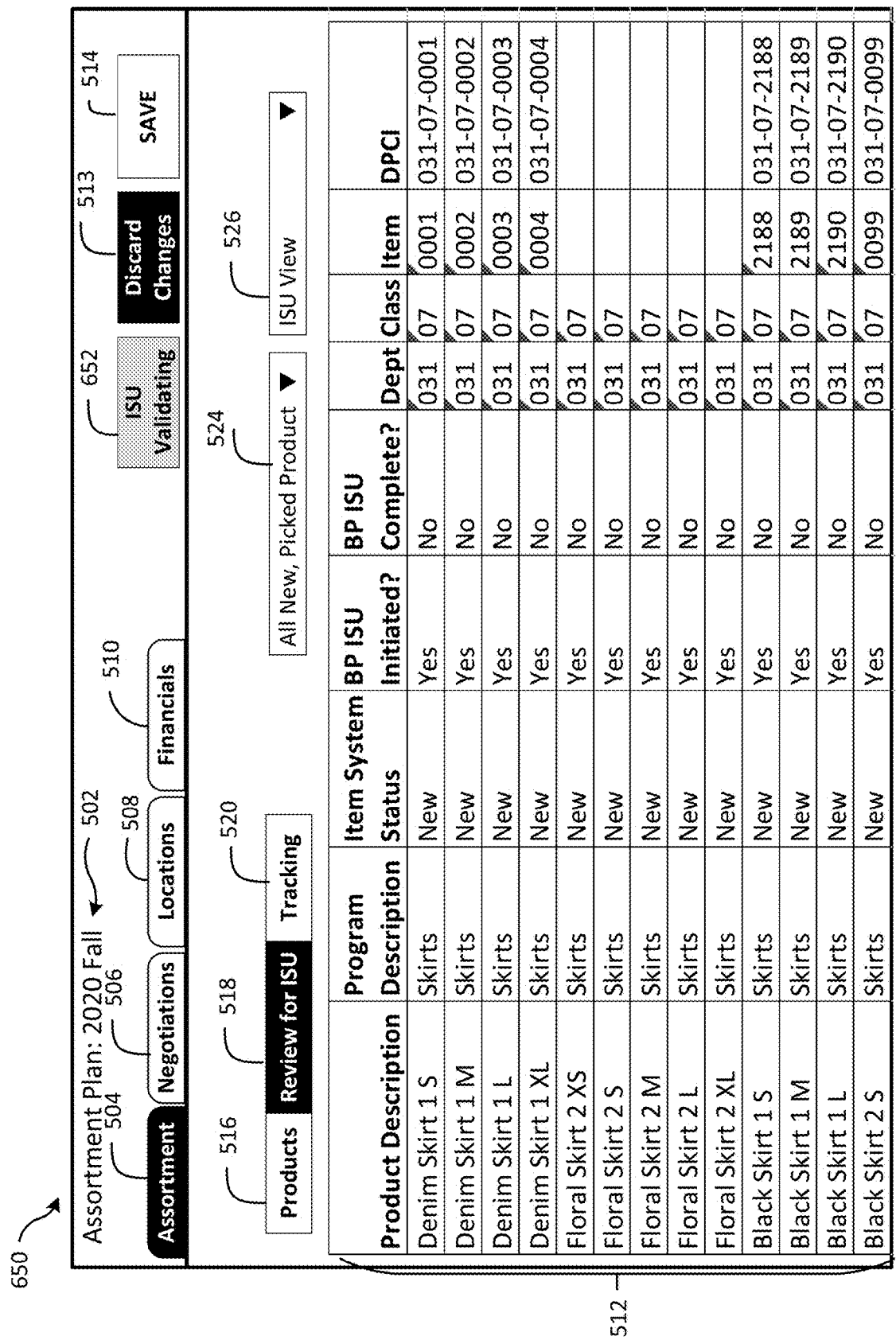
FIG. 9 illustrates another example display of the graphical user interface of FIG. 6.

FIG. 9 illustrates another example display 650 of the GUI as presented to a merchandiser or assortment planner. The Assortment tab 504 is selected as well as the option for "Review for ISU" 518. This display allows a planner to review item records and submit completed item records for item set up (ISU). The completed item records that are submitted are used in other systems within a retail enterprise for tracking inventory. The product attributes gathered during planning and negotiations do not need to be entered again, saving time and computing power.

An option for "ISU Validating" 652 is presented in this view. Additionally, the data selector 524 has been modified to choose the option for "All New, Picked Product." The view selector 526 has been modified to choose the option for "ISU View." These selections control what item information is displayed in the item record table 512. Again, the item record table 512 shows rows representing individual products. The columns represent various attributes. In the example of FIG. 9, the columns include: Product Description, Program Description, Item System Status, BP ISU Initiated? (indicates whether item set up for a particular business partner has begun), BP ISU Complete? (indicates whether item set up for a particular business partner has been completed), Dept, Class, Item, and department-class-identifier (DPCI).

As seen in FIG. 9, various items represented by item records are in different states of item set up. For example, the "Denim Skirt" item subset has a full definition including a product identifier (DPCI), while that attribute has not yet been populated for the various "Floral Skirt" items. Additionally, as seen in comparing FIG. 6 to FIG. 9, it can be seen that in a general assortment planning phase, general item types are defined, while in FIG. 9 a specific item is negotiated. Once a specific item is defined and associated with the item types in the assortment, the item type may acquire additional attributes, such as the DPCI assigned to a particular item, that DPCI may also be linked to the product description used for assortment planning purposes, indicating a link between the planned assortment and the actual item fulfilling the retailer's desire for a particular item or item type.

Figure 10:
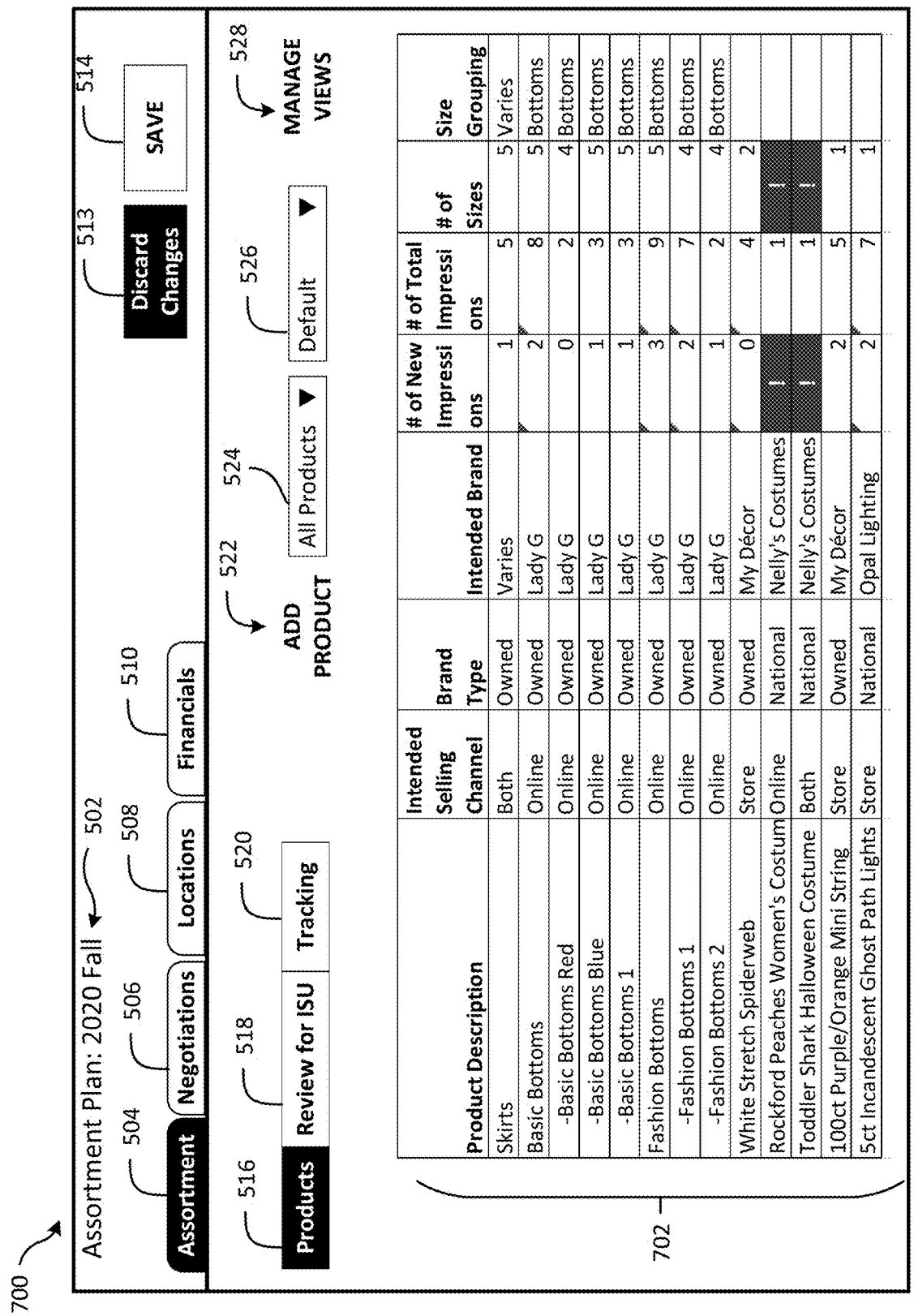
FIG. 10 illustrates another example display of the graphical user interface of FIG. 6.

FIG. 10 illustrates another example display 700 of the GUI as presented to a merchandiser or assortment planner. This display 700 is similar to the display 500 shown in FIG. 6. However, in this display 700 a product assortment table 702 shows different types of attribute information. In the display 700, a product assortment is provided and illustrates the specific products that are available within the assortment. A merchandise planner may define a number of types of items and number of sizes of items (impressions and sizes, respectively) while designating a specific, targeted brand under which the item may be sold (e.g., either a national brand or a store brand). Generally, the information provided in the product assortment table 702 will be accessible to planners and buyers of the retailer, but again will not be entirely available for viewing by a vendor seeking to bid to provide such items, since vendors are generally not able to view the entirety of the retailer's planned product assortment for a future time period (e.g., a future clothing sales season).

Additionally, as seen in the product assortment table 702, a relationship between an item line and individual items may be perceived. For example, the "Basic Bottoms" item line will have sub-lines for various colors of items, and each of those items may be negotiated for a number of sizes. In item records (referring to FIGS. 3-4), each item having a unique color and size may be individually reflected in an item record, with the display 700 presenting an aggregated view of those items based on the item records, which more closely aligns with a planned item assortment, thereby simplifying the view of item negotiations with vendors from the perspective of overall assortment planning by a merchandise planner.

Referring to FIGS. 1-10 generally, it is noted that the methods and systems described herein have a number of advantages over existing product planning and vendor negotiation tools. In particular, by integrating product planning with vendor negotiation on a single record managed by the common item data management system 100, and managing access rights to records appropriately during an item planning and vendor negotiation processes, a single record may be used and gradually populated with item attributes as those attributes are defined in a product planning process. This minimizes the number of disparate product plans that are exchanged among assortment planners and buyers, as well as between buyers and vendors, while also giving a financial planner insight into the status of a product plan both before and during vendor negotiations. This improved visibility throughout the organization, which was practically impossible using disparate tools and unsynchronized data records, not only simplifies the product assortment planning process for the retailer, it provides efficient recordkeeping, reduces duplication, loss, or inconsistency of item data records, and ensures compliance with initial assortment plans and budget constraints/goals. Other advantages are provided as well, as are reflected above in the present disclosure.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A common item data management system comprising:
   an item records data store maintaining a common editable data set of item records that is accessible to an assortment planning tool and a product negotiation tool prior to, during and after an assortment planning process and a vendor negotiation process, wherein the common editable data set is exposed to external computing devices associated with one or more vendors;
   a processing device; and
   a memory device comprising instructions that, when executed by the processing device, perform the following operations:
   prior to the vendor negotiation process, receiving input initiating creation of an item record within the common editable data set of item records;
   saving the item record to the item records data store within the common editable data set of item records;
   receiving attribute information for an item corresponding to the item record from a first computing device, wherein the attribute information includes item attribute information for a plurality of item attributes, vendor price attribute information, and retail price attribute information;
   saving the attribute information to the item record in the item records data store within the common editable data set of item records;

receiving, as part of a negotiation process mediated at a product negotiation tool, a request for the item record from a second computing device;

determining permissions to access and edit the common editable data set for the second computing device relative to the attribute information of the item record, wherein the second computing device is an external computing device;

communicating permitted attribute information from the item record within the common editable data set of item records to the second computing device within a first instance of a product negotiation user interface, wherein the permitted attribute information includes the vendor price information and at least one item attribute of the plurality of item attributes, wherein the permitted attribute information is presented and editable at the second computing device, and wherein the retail price attribute information is not included within the permitted attribute information and is not presented on the first instance of the product negotiation user interface;

receiving updated attribute information for the item record from a third computing device at the product negotiation tool based on input at the third computing device at a second instance of the product negotiation user interface, the updated attribute information updating at least a portion of the item attribute information, the second instance of the product negotiation user interface displaying the vendor price attribute information and the retail price attribute information; and saving the updated attribute information to the item record within the common editable data set of item records, wherein at least a portion of the updated attribute information corresponding to the item record is concurrently accessible via the assortment planning tool on at least one of the first computing device, the second computing device and the third computing device throughout the assortment planning process, and is also accessible via the product negotiation tool from any of the first computing device, the second computing device and the third computing device throughout the vendor negotiation process, wherein the assortment planning tool is configured to assist in planning types and quantities of items presented for sale at a retail enterprise and the product negotiation tool is configured to mediate negotiations between a buyer for the retail enterprise and the one or more vendors regarding purchase of the items presented for sale by the retail enterprise and upon completion of the negotiations over the item record between the buyer and the one or more vendors, locking negotiated attributes of the item record and storing the item record within the common editable data set of item records maintained by the item records data store such that no further changes can be made to the item record from the product negotiation tool.

2. The system of claim 1, wherein the item records data store stores a plurality of item records each corresponding to an item of the items that is being negotiated for sale by the retail enterprise.

3. The system of claim 1, wherein each item record is stored as a row in a database table and columns in the table represent various categories of attributes.

4. The system of claim 1, wherein the first computing device and the third computing device are the same.

5. The system of claim 1, wherein the second computing device and the third computing device are the same.

6. The system of claim 1, further comprising an application programming interface configured to mediate communication of information between the item records data store and a plurality of planning tools including the assortment planning tool.

7. The system of claim 1, further comprising a graphical user interface configured to present information accessed from the item records data store to a display of a computing device, wherein the information accessed is controlled by permissions for each of a plurality of types of users.

8. A method of managing assortment planning information, the method comprising:

(a) prior to a vendor negotiation process, receiving input at a common item data management system to create an item record;

(b) saving the item record in an item records data store, the item records data store maintaining a common editable data set of item records that is accessible to an assortment planning tool and a product negotiation tool prior to, during and after an assortment planning process and the vendor negotiation process, wherein the common editable data set is exposed to external computing devices associated with one or more vendors;

(c) receiving attribute information for an item associated with the item record within the common editable data set of item records from a first computing device, wherein the attribute information includes item attribute information for a plurality of item attributes, vendor price attribute information, and retail price attribute information;

(d) saving the attribute information with the item record within the common editable data set of item records;

(e) receiving, as part of a negotiation process mediated at a product negotiation tool, a request for the item record from a second computing device;

(f) determining permissions to access and edit the common editable data set for the second computing device relative to the attribute information of the item record, wherein the second computing device is an external computing device;

(g) communicating permitted attribute information from the item record to a product negotiating tool accessible by the second computing device associated with the one or more vendors within a first instance of a product negotiation user interface, wherein the permitted attribute information includes the vendor price information and at least one item attribute of the plurality of item attributes, wherein the permitted attribute information is presented and editable at the second computing device, and wherein the retail price attribute information is not included within the permitted attribute information and is not presented on the first instance of the product negotiation user interface;

(h) receiving updated attribute information for the item from the product negotiating tool, at a second instance of the product negotiation user interface of a third computing device, the updated attribute information updating at least a portion of the item attribute information, the second instance of the product negotiation user interface displaying the vendor price attribute information and the retail produce attribute information;

(i) saving the updated item attributes to the item record within the common editable data set of item records, wherein at least a portion of the updated attributes corresponding to the item record is concurrently accessible via the assortment planning tool on at least one of the first computing device, the second computing device and the third computing device throughout the assortment planning process and the product negotiation tool from any of the first computing device, the second computing device and the third computing device throughout the vendor negotiation process, wherein the assortment planning tool is configured to assist in planning types and quantities of items presented for sale at a retail enterprise and the product negotiation tool is configured to mediate negotiations between a buyer for the retail enterprise and the one or more vendors regarding purchase of the items presented for sale by the retail enterprise and upon completion of the negotiations over the item record between the buyer and the one or more vendors, locking negotiated attributes of the item record and storing the item record within the common editable data set of item records maintained by the item records data store such that no further changes can be made to the item record from the product negotiation tool;

(h) repeating steps (c) to (g) until all desired attributes are recorded to the item record; and (i) locking the item record.

9. The method of claim 8, further comprising, before step (i), communicating attribute information of the item record to the assortment planning tool.

10. The method of claim 8, further comprising, before step (i), receiving updates to attribute information of the item record from the assortment planning tool.

11. The method of claim 8, further comprising automatically updating an assortment plan based on the updated attribute information.

12. The method of claim 8, further comprising presenting a graphical user interface on a computing device, the graphical user interface comprising:

a display of item records and attributes; and fields to enter and update item attributes.

13. The method of claim 12, wherein the graphical user interface is configured to highlight attribute information that have been recently added or updated.

14. The method of claim 8, wherein the input to create an item record is received from the assortment planning tool and is associated with a product line, the input generating a plurality of related item records.

15. The method of claim 8, wherein the item record includes a plurality of item attributes and is accessible by a plurality of entities, wherein access by each of the plurality of entities provides different viewing and editing privileges regarding individual ones of the plurality of item attributes.

16. The method of claim 8, wherein a view of the item record provided by the assortment planning tool is different from a view of the item record provided by the product negotiation tool.

* * * * *